Aug. 5, 1924.
F. T. ROBERTS
1,503,665
METHOD OF AND APPARATUS FOR MAKING ANNULAR SHEETS OF RUBBER
Filed Dec. 29, 1919      3 Sheets—Sheet 1
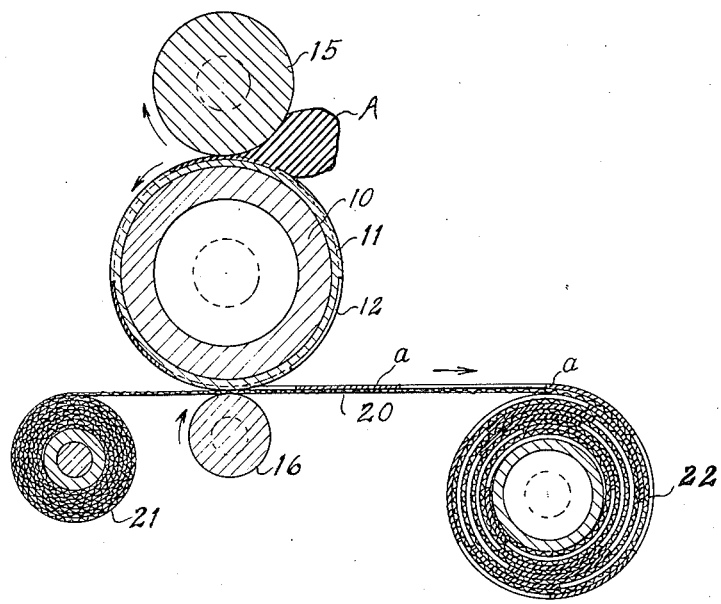
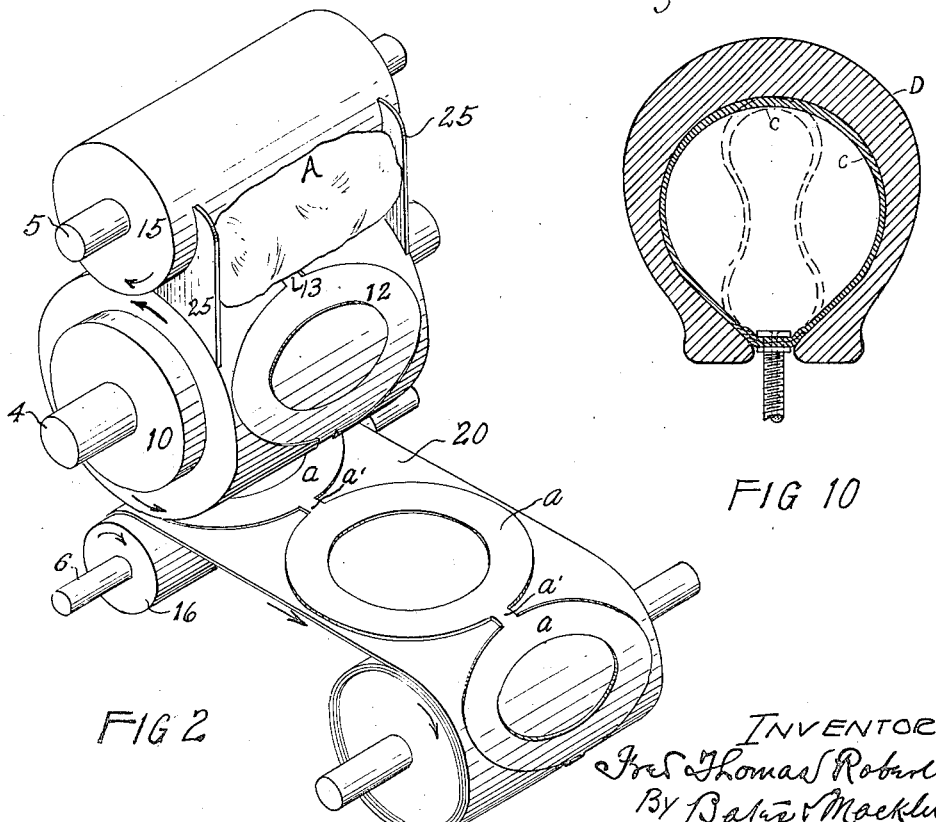
INVENTOR
Fred Thomas Roberts,
By Baker & Macklin,
ATTORNEYS.

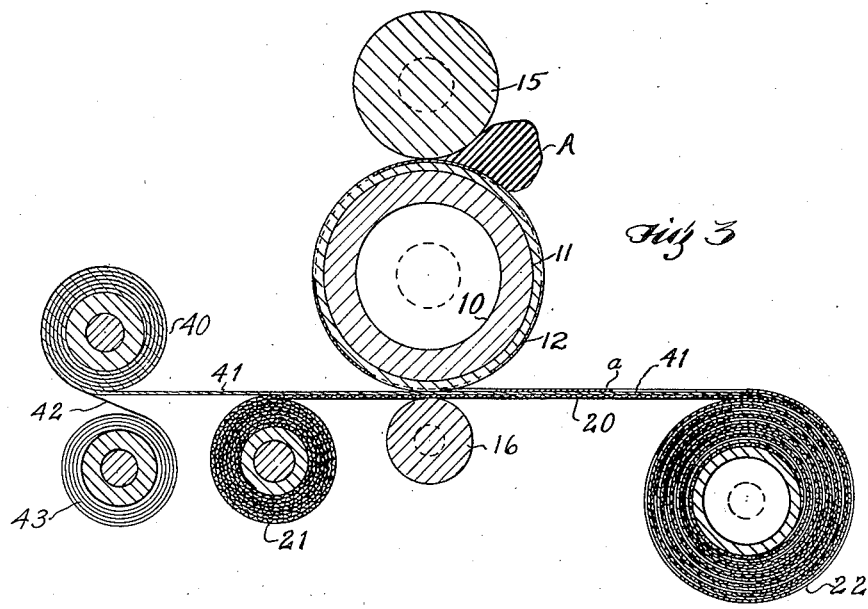
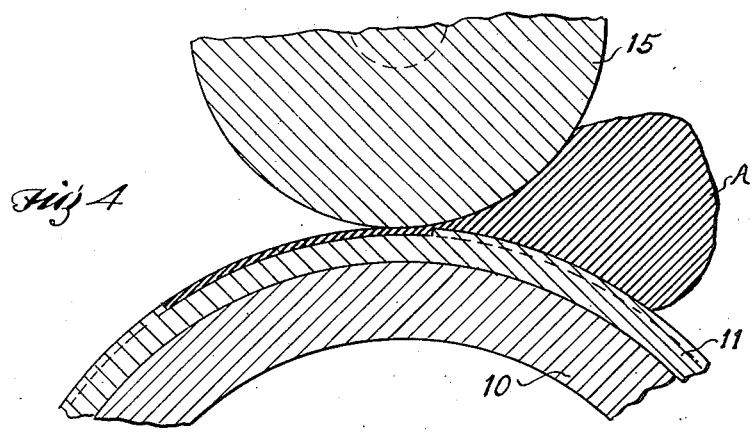
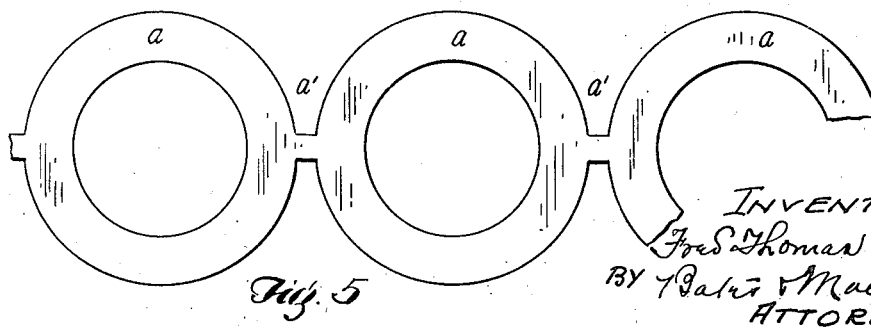

Patented Aug. 5, 1924.

1,503,665

UNITED STATES PATENT OFFICE.

FRED THOMAS ROBERTS, OF CLEVELAND, OHIO.

METHOD OF AND APPARATUS FOR MAKING ANNULAR SHEETS OF RUBBER.

Application filed December 29, 1919. Serial No. 348,096.

*To all whom it may concern:*

Be it known that I, FRED THOMAS ROBERTS, a citizen of the United States, residing at Cleveland, in the county of Cuyahoga and State of Ohio, have invented a certain new and useful Improvement in Methods of and Apparatus for Making Annular Sheets of Rubber, of which the following is a full, clear, and exact description, reference being had to the accompanying drawings.

In the production of annular rubber tubes, as, for example, inner tubes for automobile tires, it is very desirable to produce the tube by pneumatically forcing sheets of rubber into annular mold cavities in two members, then bringing the members together to join them at peripheral seams; the joined rubber being sheared off adjacent to the seams. If an ordinary calendered sheet is used for this purpose a disc of rubber of considerable size has to be discarded from the interior of the annulus and pieces at the exterior. While such discarded material is not entirely wasted, its value is reduced by the necessary re-calendering.

An object of this invention is to provide means for producing calendered rubber directly in annular sheets ready for use with annular forming molds and with the waste practically eliminated or greatly reduced. To this end, I provide a set of calendering rolls, one of which is arranged with annular cavities to produce at first hand the calendered sheet in annular form. Means are provided to take care of such annular sheets and wind them onto a roll ready for use. The invention includes a process comprising these features and other more specific characteristics, and also an apparatus useful in carrying out the process, as hereinafter explained.

Figure 6:
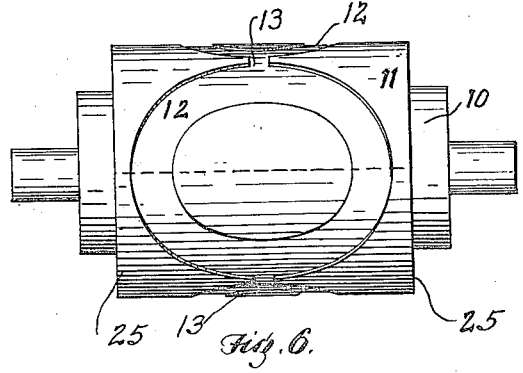
Figure 7:
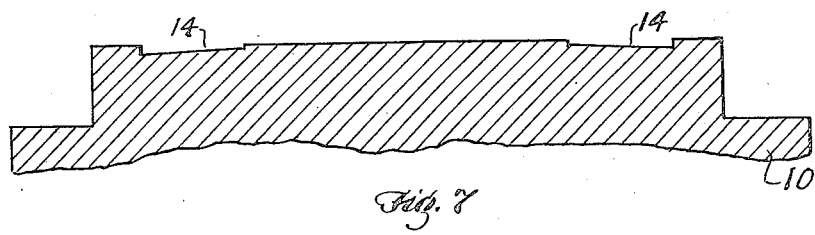
Figure 8:
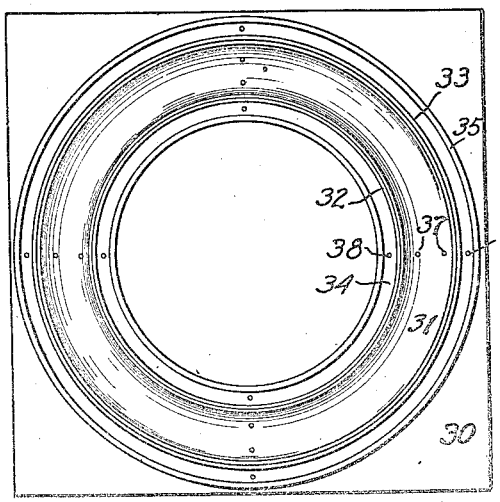
Figure 9:
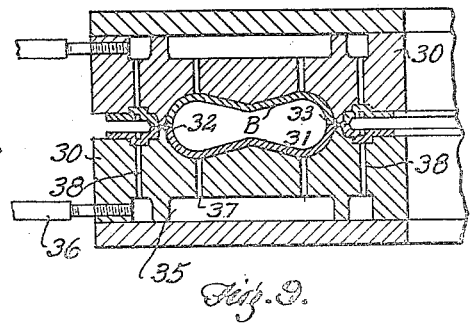

The drawings illustrate somewhat diagrammatically an apparatus used in performing my method, and also illustrate the use of the annular sheets. Fig. 1 is a cross section of the calendering apparatus, the frame thereof and the driving mechanism being omitted; Fig. 2 is a perspective view of such apparatus; Fig. 3 is a vertical cross section illustrating a method and apparatus for economically increasing the thickness of the sheets; Fig. 4 is a detail, being an enlarged fragmentary cross section of adjacent portions of the first-pass rolls of the calendering apparatus; Fig. 5 is a plan of the product produced by the apparatus shown; Fig. 6 is a plan of the main or forming roll of the apparatus; Fig. 7 is an enlarged fragmentary longitudinal section of a forming roll adapted for producing a sheet thickened adjacent to the outer periphery; Fig. 8 is a plan of a tire-forming mold for utilizing the annular sheet; Fig. 9 is a fragmentary vertical section through two of such tire-forming molds in coaction, showing the rubber stock seated therein; Fig. 10 is a cross section of an inner tube in place in a tire casing, this tube being thickened at the tread and adapted to be made by the molds of Figs. 8 and 9 from annular sheets produced by the roll of Fig. 7.

As shown in Figs. 1 to 4 and 6, 10 indicates the body of the main forming roll, which has on its exterior a shell 11 formed with a series of annular cavities 12. These cavities are placed equidistant about the roll, three being shown, and are connected by transverse passageways 13. Coacting with the main forming roll and above it is a cylindrical pressure roll 15, while below it is a roll 16. The three rolls are carried by suitable shafts or gudgeons, designated 4, 5 and 6 respectively, which are mounted in a suitable frame, not shown, and are driven by suitable mechanism, not shown.

In Figs. 1, 2 and 3, 20 designates a canvas sheet which passes from a supply roll 21 through the pass of the rolls 10 and 16 onto a suitable receiving roll 22. In Fig. 2, 25 designates end stops for the raw rubber stock, being thin plates circularly grooved on their inner edges and adapted to stand close to the surface of the rolls 10 and 15. These stops are carried by any suitable support, not shown.

In operation, a mass of raw rubber stock, ilustrated by A in Figs. 1, 2, 3 and 4, is placed between the guides 25 in position to be fed into the pass of the rolls 15 and 10. These latter rolls are adjusted so that they are in contact, or substantially so. When these rolls are rotated in the direction of the arrows in Figs. 1 and 2, the raw stock is pinched between them and is drawn into the annular cavities of the roll 10 and by the pressure of the roll 15 is made into a flat sheet, which is carried around on the roll 10 and passes in conjunction with the canvas 20 through the pass of the rolls 10 and 16. The canvas with the annular sheets $a$ thereon, thence passes to the take-up roll 22 which is suitably driven to wind up the finished product.

To readily effect stripping from the forming roll, I connect the annular cavities by the transverse passageways 13 referred to, so that the annular sheets $a$ are all connected by narrow strips $a'$, Figs. 2 and 5. When the operation is started the first annular sheet produced is stripped by hand after it passes between the rolls 10 and 16, and is laid on the canvas sheet 20, and thereafter the connecting strips $a'$ are sufficient to insure the stripping of each annular sheet as produced.

By these means described, I provide a continuous sheet of concatenated annuli as illustrated in Fig. 5, which is wound up on the roll 22 with interposed canvas. After a roll 22 of canvas and annuli of convenient size has been produced, it is removed from the apparatus, and is ready for use whenever desired. In use the removed roll 22 is partially unwound, and each annulus as required is severed from the end of the strip of annuli by cutting through the connecting tongue $a'$ adjacent to the outer periphery of the annulus.

Fig. 8 is a plan of a forming mold comprising a block 30 having an annular cavity 31 embraced internally and externally by annular cutting edges 32 and 33, beyond which are annular grooves 34 and 35. If the annular sheet $a$ is laid on the face of this mold and vacuum applied to the groove, the edge portions of the sheet will be clamped in the grooves 34 and 35 and the intermediate portion drawn down into the main groove 31. The vacuum conduit may consist of an annular chamber 35, Fig. 9, in the base portion of the mold, with which a suction pipe 36 communicates, this chamber communicating with the main cavity 31 by passageways 37 and with the vacuum grooves by passageways 38. Such a mold is shown, described and claimed in my application No. 323,851, filed September 15, 1919.

When two annular sheets have been seated in two mold members 30, as above described, these members are brought into conjunction by outside pressure, and the two rubber sheets are thus joined together and an effective seam formed at the inner and outer periphery while the cutting edges 32 and 33 remove the suplus stock. There is thus produced an annular tube, as illustrated at B in Fig. 9. The tube shown in this figure is in cross section an elongated loop with a contracted waist, which has advantages of ready insertion in a tire casing, and adaptability to be extended at the sides into an approximately pear-shaped form without undue stretching. The particular shape of the article, however, is independent of the present invention.

It is sometimes desirable to vary slightly the thickness of the annular sheets formed. If the variation is great a different shell 11 is provided in an apparatus, with cavities of a different depth, but a slight increase in thickness may be effectively produced by running a thin sheet of rubber through the pass of the rolls 10 and 16 on the face of the canvas. The internal and external excess of such thin sheet is to be eventually removed and is of reduced value for subsequent use, but it is small enough in quantity so that this reduction in value is practically negligible.

Fig. 3 illustrates the apparatus adapted for increasing the thickness of the strip of concatenated annuli, as above described. In this view, 40 indicates a wound-up sheet of canvas surmounted by a thin layer of calendered rubber. The rubber 41 of this sheet is stripped from its canvas 42 and fed through the lower pass of the apparatus on top of the canvas sheet 20 and is wound up with that sheet and thus produces a thin rubber base sheet to which the annuli adhere as produced, the canvas 42 in the meantime being wound up on a roll 43. When this laminated rubber sheet is to be used, it may be simply cut off at right angles to its length, the thin base portion being thus a square, and the internal and external excess of this sheet being removed along with the internal and external edges of the annulus, which lie beyond the cutting edges of the forming molds.

It is sometimes desirable to form the tire tube thickened adjacent to its tread portion. This may be readily accomplished by having the annular sheet thicker adjacent to its outer periphery. To make such thickened annular sheets, I make the cavities on the forming roll 10 gradually deeper adjacent to the outer edge, as illustrated by the cavities 14 in Fig. 7. This produces an annular sheet which in cross section is slightly wedge-shaped, and when such sheets are seated in the forming molds and joined together, they produce a tube gradually thickened at and toward the tread portion.

Fig. 10 shows at C the thickened tread tube just described, expanded for use within a tire casing D. In such expansion the sides become comparatively thin where thickness is not needed, but there is a material thickening adjacent to the tread, as indicated at $c$, where thickness is desired.

I claim:

1. The method of producing annular sheets and thickening them, comprising passing raw rubber between calendering rolls, one of which is formed with connected cavities, passing between the forming roll and a coacting roll a strip of canvas carrying a thin sheet of raw rubber, the formed concatenated annuli being caused to adhere to such thin sheet, and winding up the resultant product as a unit.

2. An apparatus for making annular sheets of rubber comprising a pair of coacting rolls, one roll of the pair being formed with an annular cavity in its surface, a portion of the surface of the roll within the cavity being in substantial alignment with the surface outside of the cavity, and the other roll having a smooth surface which coacts with the cavity.

3. An apparatus for making annular sheets of raw rubber comprising a pair of rolls, one of which has a smooth cylindrical surface and the other of which has a series of annular cavities formed equidistantly about its surface and depressed within such surface, each cavity being connected with the adjacent cavity by a circumferential passageway.

4. In an apparatus of the character described, the combination of a forming roll having annular cavities in its surface, two other rolls coacting with said forming roll, means for holding a strip of fabric passing between said forming roll and one of the other rolls, said fabric being adapted to receive annular sheets made by the forming roll, and a roll for winding up the fabric and annular sheets.

5. In an apparatus of the character described, the combination of a forming roll having an annular cavity in its surface, a roll coacting therewith to feed raw rubber between them, a second roll coacting with the forming roll, means for holding a strip of fabric passing between the forming roll and said second roll, another roll of fabric and rubber, a roll for receiving the fabric from the last mentioned roll and allowing the rubber thereof to pass onto the strip of fabric and move with it through the pass of the forming roll and its second coacting roll.

In testimony whereof, I hereunto affix my signature.

FRED THOMAS ROBERTS.